Jan. 7, 1947. T. S. HULTGREN 2,413,974
DEVICE FOR INDICATING THE LAST ITEM OF A TELEPHONE NUMBER DIALED
Filed April 24, 1944
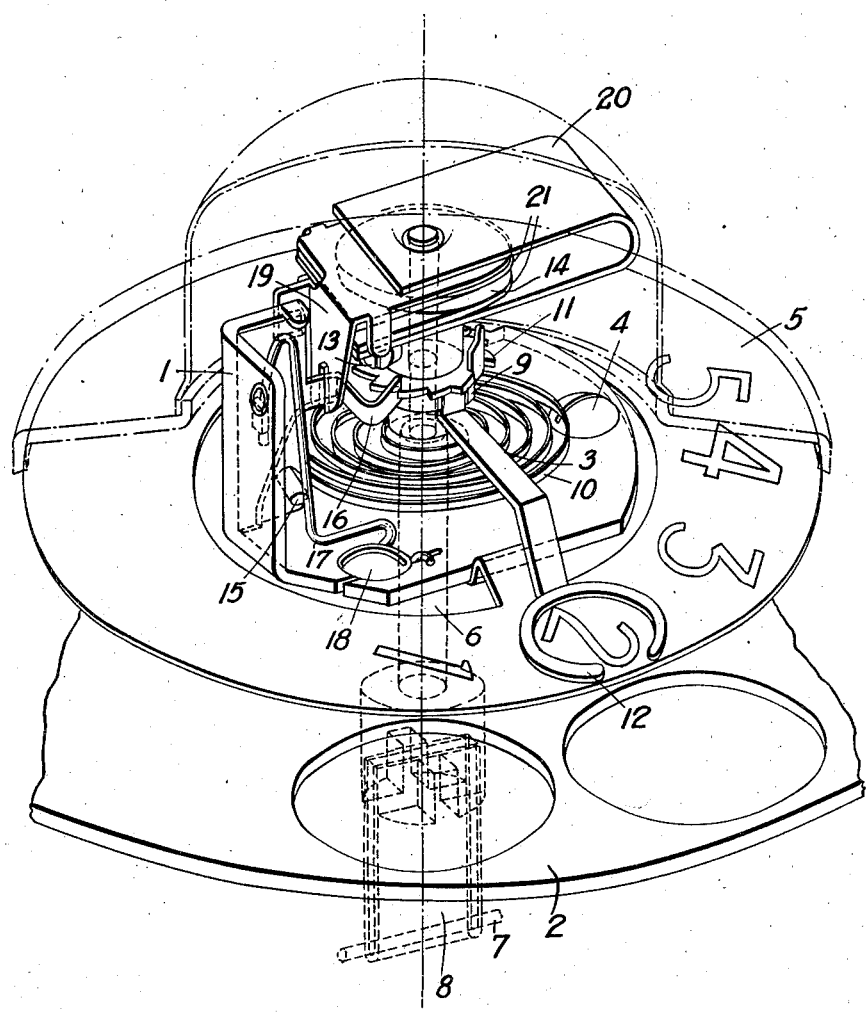
Inventor:
T. S. Hultgren,
by Jewett Downing Suttle
Attorneys Patented Jan. 7, 1947

2,413,974

UNITED STATES PATENT OFFICE 2,413,974

DEVICE FOR INDICATING THE LAST ITEM OF A TELEPHONE NUMBER DIALED

Tage Stefan Hultgren, Stockholm, Sweden, assignor to Telefonaktiebolaget L. M. Ericsson, Stockholm, Sweden, a company of Sweden Application April 24, 1944, Serial No. 532,555
In Sweden May 14, 1943

5 Claims. (Cl. 179—90)

This invention relates to an indicating device by finger dials and similar apparatus. The invention has for an object an arrangement automatically enabling a remaining indication of the last dialled character by means of an inaccessible indicating device. The indicating device returns to its initial position as soon as a new dialling has commenced, unauthorized interference with a given indication and accidental operation thereby being recorded. Furthermore, indication of the first character should not take place until the dialling has proceeded to a certain angle, whereby the indication shows the character corresponding to the emitted impulse series irrespective of the manner in which the dialling has taken place. The indicating device shall only stop opposite a character or a digit. According to the invention this is achieved principally by a ratchet wheel revolving freely in relation to the central shaft of the dial, said ratchet wheel being connected to an indicating device and a restoring spring and by a catch accompanying the dialling movement of the dial which is arranged to mesh with the ratchet wheel as soon as the dial commences its return movement and to set out of gear as soon as the dialling movement commences.

The invention will be more closely described with reference to enclosed drawing which gives a schematic view in perspective of the foremost details of a dial provided with the indicating mechanism according to invention.

The dial may be of normal design. In the drawing, only the details of the dial are shown as are co-operative with said indicating device.

The body of the indicating mechanism consists of a holder 1 being secured on the central part 3 of the hole disc 2 of the dial and on the central shaft of the dial, preferably by means of a flush mounted screw. The position of holder 1 in the rotary direction is determined by a screw 4. The number disc 5, which is punched in the middle, is secured by the holder and kept in place by its normal control studs. In order to obtain a device rigidly connected to the body of the dial opposite the mobile hole disc the following arrangement is provided. A shaft 6 is secured in the hollow central shaft of the dial. At its back end and at a certain distance from the back part of the dial (as shown on the drawing at the lower part of the shaft 6) the shaft 6 is provided with a head or enlargement, in which are made two diametrical cuttings perpendicular to each other. This enlargement is mechanically connected to a part 7, secured on the back part of the dial, said part consisting of the locked part of the driving spring of the dial, a bridle 8 which passes over the part 7 being inserted without play, at the resilient and outwardly bent legs of its open end, into the cuttings of said enlargement. Parts 7 and 8 are shown in broken lines in the drawing. On the part of said locked shaft 6 projecting from the hole disc a pointer device is provided. It consists of a hub 9 and of the following parts riveted to the hub: a coil-spring 10, a ratchet wheel 11 and a pointer 12, the latter being inserted with an angularly bent part into a cutting in the hub 9 and having an edge which projects through a notch in the ratchet wheel 11 so that the position of the pointer and the ratchet wheel in relation to each other is determined at the riveting. Said edge projects so much as to be able to serve as a stop in the home position by striking against a screw 13 secured in the shaft 6 and fixes a friction wheel 14 on the shaft opposite the pointer. The pointer moves with its claw-shaped outer end 12 closely over the digits of the number disc and encircles the digit to be indicated. The outer end of the coil-spring 10 is fixed in the holder 1 by means of a stud 15. A catch 16 for the ratchet wheel 11 is provided in the holder 1, a spring 17 thereby pressing the back part of the catch against a corner of holder 1 causing the spring to strike against an edge of the catch. The long egg-shaped edge of the catch is thereby lying inmost in the corner and the lateral plane of the catch strikes against a radial part of the holder plane. The spring 17 is secured to the holder with the screw 18. The catch is encircled at its centre part by a claw on an angularly bent device 19 being fixed by a spring bridle 20 at the friction wheel 14. Washers 21 of suitable friction material are placed on each side of the wheel. Edges of the angular device 19 prevent this from turning in relation to the spring bridle and the friction washers.

The operation will now be more closely described. On the drawing pointer 12 encircles the digit 2, that is, at the last dialling said digit was indicated. At a subsequent dialling the hole disc will move clockwise in the usual way, whereby the holder 1 and the parts fixed thereto also move clockwise. However, the screw 13 and friction wheel 14, which are fixed in the shaft 6, remain still. To commence with, the angular device 19 is retained under the influence of frictional forces from the friction wheel 14. Immediately on commencement of the dialling the claw on device 19 pushes the catch 16 out of gear to the ratchet wheel 11 which, being influenced by the spring 10 is restored to a home position somewhat to the left of digit 1. Said home position is determined for example by aforesaid edge on pointer 2 striking against the screw 13. On the dialling movement being continued, the pointer remains still in relation to the hole disc and the number disc. The angular device 19 remains unmovable only during so small a fraction of the dialling operation as is sufficient to affect the catch 16. Hereafter the holder 1 during its movement strikes against an edge of device 19, bringing same with it during the remainder of the dialling, thereby overcoming the frictional forces. As soon as the restoring movement sets in, the angular device 19 is immediately released same not longer retaining the catch in a pulled out position. The catch thereby immediately falls into the next tooth groove. Pointer 12 will now indicate the digit corresponding to the dialling.

As is shown in broken lines on the drawing the number disc proper is covered by a transparent, ring-shaped cover being raised so much above the number disc as to allow the pointer to move freely. The cover is kept by a hood which covers the other details of the indicating device. The hood, being screwed to the holder 1, forms, together with the cover, a protection in relation to the hole disc.

I claim:

1. In a device for indicating the last item of a telephone number dialed by a rotatable finger dial, a ratchet member rotatable about the axis of rotation of said finger dial, an indicating member rotatable with said ratchet member, a catch member operative during return movement of the finger dial to move the ratchet and indicating members therewith, means to render the catch member inoperative during advanced movement of the finger dial, and means for restoring the ratchet and indicating members to initial position when said catch member is rendered inoperative.

2. A device as claimed in claim 1 wherein said means includes a frictionally retarded member actuated by the finger dial for rendering the catch device operative or inoperative in dependence upon the direction of movement of the finger dial.

3. In a device for indicating the last item of a telephone number dialed by a rotatable finger dial, a ratchet member rotatable about the axis of rotation of the finger dial, a holder rotatable with the finger dial, an indicating member movable with the ratchet member, a catch member co-acting with the ratchet member, a frictionally retarded member co-acting with the catch member to render the latter inoperative upon initiation of advance movement of the finger dial, the catch member being carried along by said holder throughout the following advance movement of the finger dial, said catch member being moved to operative position with respect to the ratchet member by the frictionally retarded member during the return movement of the finger dial and means normally tending to restore the ratchet and indicating members to initial position.

4. A device as claimed in claim 3 wherein the ratchet member is secured on a shaft inserted in the hollow central shaft of the finger dial.

5. A device as claimed in claim 3 wherein the ratchet member is secured on a shaft inserted in the hollow central shaft of the finger dial, said frictional retarded member having frictional engagement with said shaft.

TAGE STEFAN HULTGREN.